(12) United States Patent
Kacherov et al.

(10) Patent No.: US 9,124,493 B2
(45) Date of Patent: *Sep. 1, 2015

(54) SYSTEM AND METHOD FOR ENSURING COMPLIANCE WITH ORGANIZATIONAL POLICES

(71) Applicant: OpenPeak Inc., Boca Raton, FL (US)

(72) Inventors: Vadim Kacherov, Margate, FL (US); Robert M Dare, Sunrise, FL (US); Gregory Paul Watson, Colorado Springs, CO (US); Parag Goel, Coral Springs, FL (US)

(73) Assignee: OPENPEAK INC., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,792

(22) Filed: Mar. 11, 2014

(65) Prior Publication Data
US 2014/0317680 A1 Oct. 23, 2014

Related U.S. Application Data

(63) Continuation of application No. 13/564,809, filed on Aug. 2, 2012, now Pat. No. 8,713,173, and a continuation-in-part of application No. 13/179,508, filed on Jul. 9, 2011, now Pat. No. 8,745,213, and a
(Continued)

(51) Int. Cl.
*G06F 15/173* (2006.01)
*H04L 12/26* (2006.01)
(Continued)

(52) U.S. Cl.
CPC .............. *H04L 43/08* (2013.01); *G06F 21/577* (2013.01); *H04L 41/5009* (2013.01); *H04L 41/5025* (2013.01); *H04L 41/5038* (2013.01); *H04L 63/20* (2013.01)

(58) Field of Classification Search
CPC ..... H04L 43/08; H04L 63/20; H04L 41/4009; H04L 41/5025; H04L 41/5038; G06F 21/577
See application file for complete search history.

(56) References Cited

U.S. PATENT DOCUMENTS

| 6,023,721 A | 2/2000 | Cummings |
| 6,769,022 B1 | 7/2004 | DeKoning et al. |

(Continued)

FOREIGN PATENT DOCUMENTS

| WO | 2007059428 A2 | 5/2007 |
| WO | 2012064870 A2 | 5/2012 |
| WO | 2012064870 A3 | 7/2012 |

OTHER PUBLICATIONS

International Search Report and Written Opinion for International No. PCT/US2013/052836, mailed Jul. 1, 2014, 14 pages.
(Continued)

*Primary Examiner* — Wen-Tai Lin

(57) ABSTRACT

A method for ensuring compliance with organizational policies is described herein. The method can include the step of monitoring one or more parameters of a managed computing device for compliance with one or more policies of an organization in which the organizational policies may include limitations on the managed computing device. The method can also include the step of detecting a non-conformance event at the managed computing device with respect to at least one organizational policy. In response to the detection of the non-conformance event, the operation of the managed computing device may be restricted with respect to features or data associated with the organization.

20 Claims, 11 Drawing Sheets

Related U.S. Application Data continuation-in-part of application No. 13/179,509, filed on Jul. 9, 2011, now Pat. No. 8,612,582, and a continuation-in-part of application No. 13/179,510, filed on Jul. 9, 2011, now Pat. No. 8,788,655, and a continuation-in-part of application No. 13/179,511, filed on Jul. 9, 2011, now Pat. No. 8,650,290, and a continuation-in-part of application No. 13/179,513, filed on Jul. 9, 2011, now Pat. No. 8,615,581, and a continuation-in-part of application No. 13/179,514, filed on Jul. 9, 2011, now Pat. No. 8,856,322, and a continuation-in-part of application No. 12/639,139, filed on Dec. 16, 2009, now abandoned.

(60) Provisional application No. 61/139,090, filed on Dec. 19, 2008.

(51) Int. Cl.
  *H04L 29/06* (2006.01)
  *H04L 12/24* (2006.01)
  *G06F 21/57* (2013.01)
  *G06F 11/00* (2006.01)
  *H04W 24/00* (2009.01)

(56) References Cited

U.S. PATENT DOCUMENTS

| | | | |
|---|---|---|---|
| 7,039,041 | B2 | 5/2006 | Robohm et al. |
| 7,146,155 | B2 | 12/2006 | Kouznetsov |
| 7,213,146 | B2 * | 5/2007 | Stehlin ................. 713/166 |
| 7,302,488 | B2 | 11/2007 | Mathew et al. |
| 7,594,019 | B2 | 9/2009 | Clapper |
| 7,688,952 | B2 | 3/2010 | Light et al. |
| 8,060,557 | B2 | 11/2011 | Hicks, III et al. |
| 8,249,939 | B2 | 8/2012 | Cue et al. |
| 8,254,902 | B2 | 8/2012 | Bell et al. |
| 8,351,908 | B2 | 1/2013 | Bhat et al. |
| 8,359,016 | B2 | 1/2013 | Lindeman et al. |
| 8,459,544 | B2 | 6/2013 | Casey et al. |
| 8,516,446 | B2 | 8/2013 | Williams et al. |
| 8,832,652 | B2 | 9/2014 | Mueller et al. |
| 8,869,235 | B2 | 10/2014 | Qureshi et al. |
| 8,869,307 | B2 | 10/2014 | Broch et al. |
| 8,924,469 | B2 * | 12/2014 | Raleigh et al. ............. 709/203 |
| 8,924,608 | B2 | 12/2014 | Dabbiere |
| 8,949,201 | B1 | 2/2015 | Batchu et al. |
| 8,955,152 | B1 | 2/2015 | Enderwick et al. |
| 2001/0047363 | A1 | 11/2001 | Peng |
| 2002/0131404 | A1 | 9/2002 | Mehta et al. |
| 2003/0002637 | A1 | 1/2003 | Miyauchi et al. |
| 2004/0034853 | A1 | 2/2004 | Gibbons et al. |
| 2004/0052343 | A1 | 3/2004 | Glaser et al. |
| 2004/0162092 | A1 | 8/2004 | Marsico et al. |
| 2004/0249938 | A1 | 12/2004 | Bunch |
| 2005/0027980 | A1 | 2/2005 | Peled et al. |
| 2005/0183143 | A1 | 8/2005 | Anderholm et al. |
| 2006/0112428 | A1 | 5/2006 | Etelapera |
| 2006/0277209 | A1 | 12/2006 | Kral et al. |
| 2006/0277311 | A1 | 12/2006 | Franco et al. |
| 2007/0093243 | A1 | 4/2007 | Kapadakar et al. |
| 2007/0150918 | A1 | 6/2007 | Carpenter et al. |
| 2007/0165654 | A1 | 7/2007 | Chai et al. |
| 2007/0214083 | A1 | 9/2007 | Jones et al. |
| 2007/0239878 | A1 | 10/2007 | Bowers et al. |
| 2008/0115225 | A1 | 5/2008 | Jogand-Coulomb et al. |
| 2008/0140969 | A1 | 6/2008 | Lawrence |
| 2008/0222621 | A1 | 9/2008 | Knight et al. |
| 2009/0006402 | A1 * | 1/2009 | Bohle et al. .................. 707/8 |
| 2009/0213001 | A1 | 8/2009 | Appelman et al. |
| 2010/0005523 | A1 | 1/2010 | Hassan et al. |
| 2010/0217837 | A1 | 8/2010 | Ansari et al. |
| 2010/0299152 | A1 | 11/2010 | Batchu et al. |
| 2010/0299376 | A1 | 11/2010 | Batchu et al. |
| 2010/0299719 | A1 | 11/2010 | Burks et al. |
| 2010/0312849 | A1 | 12/2010 | Miyabayyashi et al. |
| 2012/0023548 | A1 | 1/2012 | Alfano et al. |
| 2012/0036220 | A1 | 2/2012 | Dare et al. |
| 2012/0066223 | A1 | 3/2012 | Schentrup et al. |
| 2012/0072985 | A1 | 3/2012 | Davne et al. |
| 2012/0102564 | A1 | 4/2012 | Schentrup et al. |
| 2012/0102574 | A1 | 4/2012 | Schentrup et al. |
| 2012/0137364 | A1 | 5/2012 | Blaisdell |
| 2012/0159567 | A1 | 6/2012 | Toy et al. |
| 2013/0007245 | A1 | 1/2013 | Malik et al. |
| 2013/0018792 | A1 | 1/2013 | Casey et al. |
| 2013/0055155 | A1 | 2/2013 | Wong et al. |
| 2013/0130652 | A1 | 5/2013 | Deasy et al. |
| 2013/0132941 | A1 | 5/2013 | Lindeman et al. |
| 2013/0219482 | A1 | 8/2013 | Brandt |
| 2014/0007222 | A1 | 1/2014 | Qureshi et al. |
| 2014/0181803 | A1 | 6/2014 | Cooper et al. |
| 2014/0230011 | A1 | 8/2014 | Drewry et al. |
| 2014/0280955 | A1 | 9/2014 | Stuntebeck et al. |
| 2014/0282828 | A1 | 9/2014 | Stuntebeck |
| 2014/0282829 | A1 | 9/2014 | Dabbiere et al. |
| 2014/0282846 | A1 | 9/2014 | DeWeese et al. |
| 2014/0282869 | A1 | 9/2014 | Dabbiere |
| 2014/0282894 | A1 | 9/2014 | Manton |
| 2014/0282897 | A1 | 9/2014 | Stuntebeck |
| 2014/0282929 | A1 | 9/2014 | Tse |
| 2014/0298462 | A1 | 10/2014 | Stuntebeck et al. |
| 2014/0310771 | A1 | 10/2014 | Marshall et al. |
| 2014/0310772 | A1 | 10/2014 | Marshall et al. |
| 2015/0082371 | A1 | 3/2015 | DeWeese et al. |

OTHER PUBLICATIONS

International Search Report and Written Opinion for Application No. PCT/US2011/068196, mailed on Jan. 2, 2013, 10 pages.
Non-Final Office Action for U.S. Appl. No. 13/033,726, mailed Mar. 5, 2013, 13 pages.
Wikipedia: "Windows Live", released Nov. 1, 2005.
Wikipedia: "Microsoft Family Safety", released Nov. 16, 2007.
International Search Report and Written Opinion for U.S. Appl. No. PCT/US2011/060023, mailed on May 25, 2012, 10 pages.
International Search Report and Written Opinion for U.S. Appl. No. PCT/US2011/051302, mailed on Jan. 26, 2012, 2 pages.
International Search Report and Written Opinion for U.S. Appl. No. PCT/US2012/045923, mailed on Oct. 4, 2012, 8 pages.
Final Office Action for U.S. Appl. No. 12/639,139, mailed Sep. 18, 2013, 7 pages.
Amendment and Reply for U.S. Appl. No. 13/179,513, filed Aug. 19, 2013, 33 pages.
Non-Final Office Action for U.S. Appl. No. 13/179,508, mailed Feb. 1, 2013, 15 pages.
Amendment and Reply for U.S. Appl. No. 13/179,508, dated Aug. 1, 2013, 21 pages.
Non-Final Office Action for U.S. Appl. No. 13/179,514, mailed Jan. 16, 2013, 4 pages.
Non-Final Office Action for U.S. Appl. No. 12/639,139, mailed Jul. 27, 2012, 6 pages.
Final Office Action for U.S. Appl. No. 13/033,726, mailed Oct. 1, 2013, 14 pages.
Non-Final Office Action for U.S. Appl. No. 13/179,513, mailed Mar. 18, 2013, 14 pages.
Non-Final Office Action for U.S. Appl. No. 13/179,511, mailed Mar. 8, 2013, pages.
Non-Final Office Action for U.S. Appl. No. 12/639,139, mailed Mar. 7, 2012, 7 pages.
Non-Final Office Action for U.S. Appl. No. 13/179,508, mailed Sep. 13, 2013, 10 pages.
Amendment and Reply for U.S. Appl. No. 13/179,510, dated Sep. 9, 2013, 19 pages.
Amendment and Reply for U.S. Appl. No. 13/179,511, dated Sep. 9, 2013 10 pages.
Amendment and Reply for U.S. Appl. No. 13/179,514, dated Jun. 17, 2013, 8 pages.

(56) References Cited

OTHER PUBLICATIONS

Non-Final Office Action for U.S. Appl. No. 13/179,509, mailed May 7, 2013, 79 pages.
Non-Final Office Action for U.S. Appl. No. 13/179,510, mailed Mar. 7, 2013, 58 pages.
Final Office Action for U.S. Appl. No. 13/179,514, mailed Jul. 24, 2013, 9 pages.
Amendment and Reply for U.S. Appl. No. 13/179,508, filed Feb. 13, 2014, 20 pages.
Amendment and Reply for U.S. Appl. No. 13/179,509, filed Aug. 6, 2013, 32 pages.
Final Office Action for U.S. Appl. No. 13/179,510, mailed Oct. 17, 2013, 12 pages.

\* cited by examiner

SYSTEM AND METHOD FOR ENSURING COMPLIANCE WITH ORGANIZATIONAL POLICES

CROSS-REFERENCE TO RELATED APPLICATIONS

This application is a continuation of application Ser. No. 13/564,809, filed on Aug. 2, 2012, which is a continuation-in-part of application Ser. Nos. 13/179,508; 13/179,509; 13/179,510; 13/179,511; 13/179,513; and Ser. No. 13/179,514, each of which was filed on Jul. 9, 2011 and each of which is a continuation-in-part of application Ser. No. 12/639,139, filed on Dec. 16, 2009, which claims the benefit of provisional application No. 61/139,090, filed on Dec. 19, 2008, each of which is incorporated by reference herein in its entirety.

FIELD OF TECHNOLOGY

The present subject matter relates to systems and methods for ensuring compliance with policies for computing devices.

BACKGROUND

Many organizations have provided their associates with mobile computing devices or have permitted their data to be stored on or accessed from mobile computing devices owned by their associates. As a consequence, such organizations run the risk of having sensitive data exposed to unauthorized sources. Another danger to these organizations is potential liability from the actions of their associates during the use of these mobile devices. To protect themselves, many organizations have developed guidelines that may limit how these mobile devices are used and what type of content may be installed on them. Even with this training, there is currently no way to ensure compliance with these guidelines.

SUMMARY

A method for ensuring compliance with organizational policies is described herein. The method can include the step of monitoring one or more parameters of a managed computing device for compliance with one or more policies of an organization. The organizational policies may include limitations on the managed computing device. A non-conformance event may be detected at the managed computing device with respect to at least one organizational policy. In response to the detection of the non-conformance event, operation of the managed computing device may be restricted with respect to features or data associated with the organization.

The organizational policies may include one or more of the following: password rules compliance; blacklisted application compliance; installation of default applications or bundle compliance; data roaming compliance; system modification compliance; or administrator control compliance. In one embodiment, the non-conformance event may include one or more of the following: selecting an unauthorized password; downloading an unauthorized application; failing to install one or more default applications or bundles; roaming on an unauthorized network; modifying the managed computing device in an unauthorized manner; or blocking administrator control of the managed computing device. In one arrangement, restricting operation of the managed computing device may include one or more of the following: removing data from the managed computing device, removing wireless communication settings or credentials from the managed computing device; removing network settings or credentials from the managed computing device; removing a proxy configuration from the managed computing device; removing an email or messaging configuration from the managed computing device; disabling device configuration updates from the managed computing device; locking out one or more profiles of the managed computing device; or messaging a user of the managed computing device.

The method may also include the step of detecting a conformance event at the managed computing device with respect to at least one organizational policy. In response to the detection of the conformance event, an operation of the managed computing device with respect to features or data associated with the organization may be enabled. As an example, the conformance event may include one or more of the following: selecting an authorized password; downloading an authorized application; installing a required set of default applications or bundles; operating on an authorized network; avoiding an unauthorized modification of the managed computing device; or permitting or not interfering with administrator control of the managed computing device.

The method may also include the step of detecting a conformance event at the managed computing device with respect to at least one organizational policy in which the conformance event corrects the non-conformance event. In response to detecting the conformance event, the operational restriction of the managed computing device can be removed.

The method can further include the step of reporting the non-conformance event in which the non-conformance event has been previously assigned a severity level. In another example, the method can include the step of waiting a predetermined amount of time before restricting operation of the managed computing device with respect to features or data associated with the organization. As an example, an organizational policy may be associated with an individual, a bundle or a node.

Another method for ensuring compliance with organizational policies is described herein. The method can include the step of setting one or more policies of an organization in which the organizational policies may be applicable to a managed computing device associated with the organization and may include limitations on the managed computing device. A report of a non-conformance event at the managed computing device may be received in which the non-conformance event can indicate that the managed computing device is violating one or more organizational policies. In response to the receipt of the reporting of the non-conformance event, operation of the managed computing device may be restricted with respect to features or data associated with the organization.

As an example, the organizational policies may include one or more of the following: password rules compliance; blacklisted application compliance; installation of default applications compliance; data roaming compliance; system modification compliance; or administrator control compliance. As another example, the non-conformance event may include one or more of the following: selecting an unauthorized password; downloading an unauthorized application; failing to install one or more default applications; roaming on an unauthorized network; modifying the managed computing device in an unauthorized manner; or blocking administrator control of the managed computing device.

The method can also include the step of receiving a report of a conformance event at the managed computing device in which the conformance event corrects the non-conformance event. In response to the receipt of the report of the conformance event, the operational restriction of the managed computing device may be removed. As an example, an organizational policy may be associated with an individual, a bundle or a node.

A managed computing device is also described herein. The device may include a display configured to at least display messages, a communications stack configured to receive communication signals from and transmit communication signals to a management platform and a processor. The processor may be communicatively coupled to the communications stack and the display. The processor may also be operable to monitor one or more parameters of the managed computing device for compliance with one or more policies of an organization in which the organizational policies may include limitations on the managed computing device. The processor may also be operable to detect a non-conformance event associated with the operation of the managed computing device in which the non-conformance event may violate one or more organizational policies. In response to the detection of the non-conformance event, the processor may be further operable to restrict operation of the managed computing device with respect to features or data associated with the organization.

As an example, the organizational policies may include one or more of the following: password rules compliance; blacklisted application compliance; installation of default applications or bundle compliance; data roaming compliance; system modification compliance; or administrator control compliance. As another example, the non-conformance event may include one or more of the following: selecting an unauthorized password; downloading an unauthorized application; failing to install one or more default applications or bundles; roaming on an unauthorized network; modifying the managed computing device in an unauthorized manner; or blocking administrator control of the managed computing device.

In one arrangement, the processor may be operable to restrict operation of the managed computing device by one or more of the following: removing data from the managed computing device, removing wireless communication settings or credentials from the managed computing device; removing network settings or credentials from the managed computing device; removing a proxy configuration from the managed computing device; removing an e-mail or messaging configuration from the managed computing device; disabling device configuration updates from the managed computing device; locking out one or more profiles of the managed computing device; or generating a message for a user of the managed computing device. In yet another arrangement, the processor may be further operable to detect a conformance event at the managed computing device with respect to at least one organizational policy, and in response to the detection of the conformance event, enable an operation of the managed computing device with respect to features or data associated with the organization. For example, the operation that is enabled is the creation of a profile or the activation of configuration updates for the managed computing device.

In another embodiment, the processor may be further operable to detect a conformance event at the managed computing device with respect to at least one organizational policy in which the conformance event corrects the non-conformance event. In response to detecting the conformance event, the processor may also be operable to remove the operational restriction of the managed computing device. As an example, an organizational policy may be associated with an individual, a bundle or a node.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
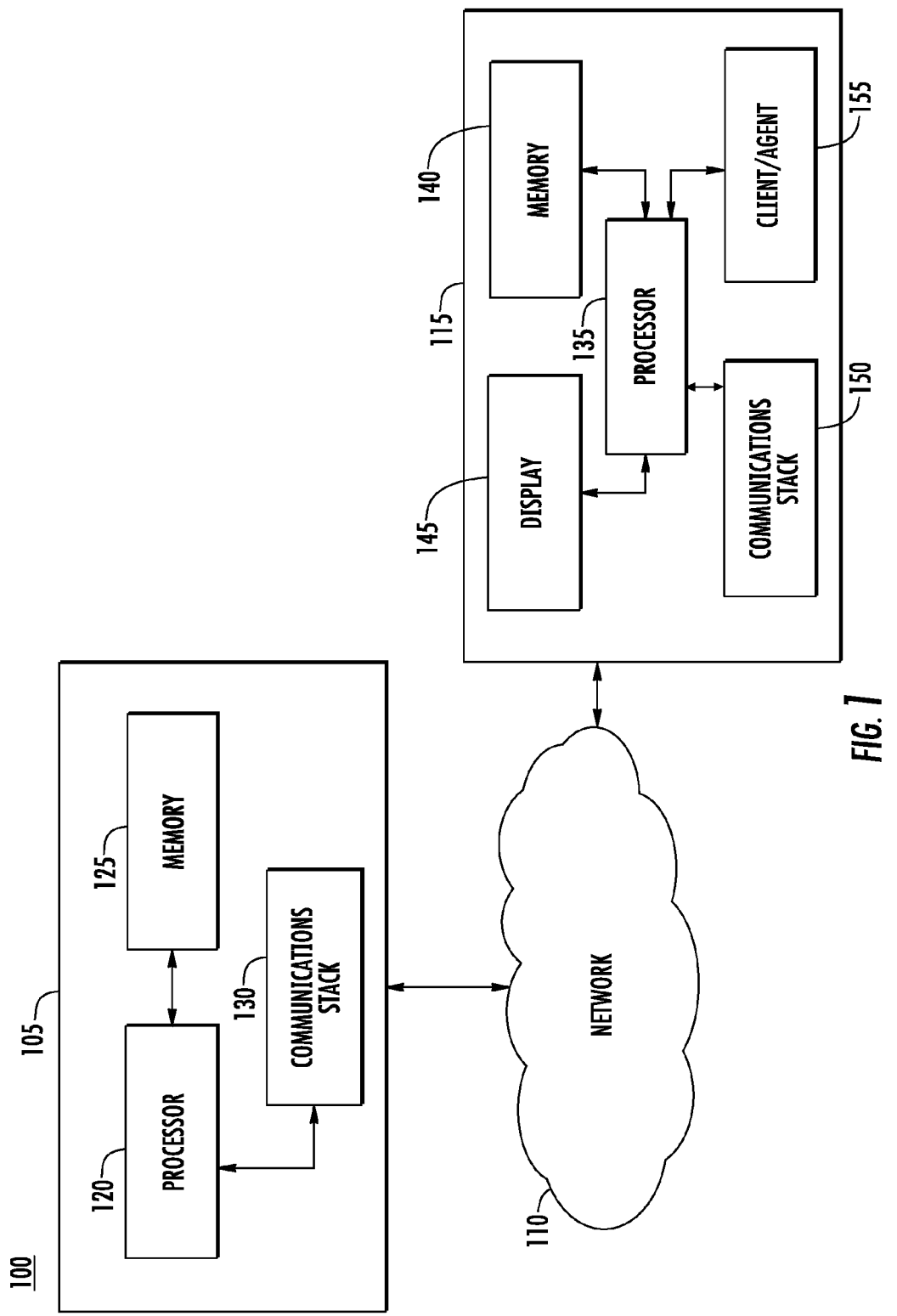
FIG. 1 illustrates an example of a system for ensuring compliance with organizational policies.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Further-more, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The definitions listed here supersede any similar definitions that are presented in any previous related patent application. The term "exemplary" as used herein is defined as an example or an instance of an object, apparatus, system, entity, composition, method, step or process. The term "communicatively coupled" is defined as a state in which two or more components are connected such that communication signals are able to be exchanged between the components in a unidirectional or bidirectional (or multi-directional) manner, either wirelessly, through a wired connection or a combination of both. A "computing device" is defined as a component that is configured to perform some process or function for a user and includes both mobile and non-mobile devices. A "managed computing device" is defined as a computing device that is at least partially subject to the control of an organization such that the organization has the capability to retrieve information from the computing device, send information to the computing device or to cause or direct an action on the computing device to occur. An "application" is defined as a program or programs that provide(s) an interface to enable a user to operate a computing device in accordance with one or more particular tasks. The term "operating system" is defined as a collection of software components that directs a computing device's operations, including controlling and scheduling the execution of other programs and managing storage, input/output and communication resources. An "organization" is defined as a business or administrative concern that is united and constructed for one or more ends.

A "parameter" is defined as a setting, operating range, event, action, notification, state or condition associated with the operation of a managed device. The term "organizational policy" is defined a policy that is defined by an organization or by another party associated with that organization and that sets guidelines, restrictions, limitations or procedures that are related to the operation of a managed computing device. The term "communications stack" is defined as a group of components that operate to enable a managed computing device to communicate with one or more other components in a wireless or wired manner or through a combination of wired and wireless media. A "processor" is defined as a component or a group of components that are configured or are operable to execute instructions or carry out processes in accordance with the description herein. A "bundle" is defined as a collection of content that is delivered to and stored on a particular group of computing devices such that the users of the group of computing devices are linked by a common characteristic or function. A "node" is defined as a level in a hierarchical setting that is commensurate with the operational scope of an organization or the operational scope of a group of related organizations.

As noted earlier, some organizations may permit their associates to access sensitive organizational data from a managed computing device, such as a mobile computing device that belongs to an associate or one that has been provided by the organization. In view of the numerous ways that this access can increase the risk that this confidential information will be exposed, it is important to ensure the operational integrity of these managed computing devices.

A solution is presented here to overcome the integrity issues associated with managed computing devices. In particular, a method and system for ensuring compliance with organizational policies are described herein. The method can include the step of monitoring one or more parameters of a managed computing device for compliance with one or more policies of an organization in which the organizational policies include limitations on the managed computing device. The method can also include the step of detecting a non-conformance event at the managed computing device with respect to at least one organizational policy. In response to the detection of the non-conformance event, operation of the managed computing device may be restricted with respect to features or data associated with the organization. Thus, if a managed computing device violates the policies of an organization, one or more features of that device may be restricted to protect the organization.

This feature may be useful in preventing employees or associates of the organization from making unauthorized modifications to the managed device or from downloading prohibited applications or content. It may also be helpful in ensuring that such employees or associates, for example, choose acceptable passwords or authorized networks for the operation of the managed computing device.

Referring to FIG. 1, a system 100 for ensuring compliance with organizational policies is shown. The system 100 may include one or more management platforms 105, one or more networks 110 and one or more managed computing devices 115. In one arrangement, the management platform 105 can include a processor 120, memory 125 and a communications stack 130. In another arrangement, the managed computing device 115 can include a processor 135, memory 140, a display 145, a communications stack 150 and a client/agent 155. The management platform 105 and the managed computing device 115 may conduct bi-directional communications through the network(s) 110, and this communication may be wireless, wired or a combination of the two. Thus, it is important to note that the network 110 may be a single network or a collection of networks to accommodate these communications. Because the system 100 may support wired or wireless communications, both the communications stack 130 of the management platform 105 and the communications stack 150 of the managed computing device 115 may be configured to accommodate either medium. In fact, either communications stack 130, 150 may be arranged to accommodate communications across disparate communications standards or protocols, like Wi-Fi, cellular, Bluetooth, etc. To do so, the communications stack 130, 150 may include multiple transceiver sets, which may or may not be integrated with one another.

The client/agent 155 may be executable code that the processor 135 may execute, which will cause the managed computing device 115 to take certain actions, as will be described below. Through this client/agent 155, the management platform 105 may receive notifications or other informational messages from the managed device 115, and the managed device 115 may receive and process messages or commands from the management platform 105. Examples of these features will be presented below.

In an exemplary summary, the managed computing device 115 may be assigned to or owned by an associate of an organization, and the associate may be able to download organizational data, applications or programs on his/her device 115. The organization, through the management platform 105, may set certain operational restrictions on the managed computing device 115 in an effort to protect itself. In one particular example, the processor 135, via execution of the client/agent 155, may monitor one or more parameters of the managed device 115. If there is a violation of one or more of the operational restrictions, the processor 135 may take steps to restrict the operation of the managed computing device 115, such as removing data from the memory 140 or rendering the communications stack 150 partially or completely inoperative. The processor 135 may also take steps to ensure that the management platform 105 is made aware of the results of the monitoring process and whether the operation of the managed device 115 has been restricted or otherwise affected in any way.

Although the monitoring of the managed device 115 and the steps taken to restrict its operation may be conducted at the device 115 itself, it is understood that the system 100 is not so limited. For example, the managed device 115 may monitor itself and send information relating to the monitoring to the management platform 105. The processor 120 of the management platform 105 may analyze this information and may then generate signals to be sent to the managed device 115, which can cause the device 115 to perform certain processes to restrict its operation. These signals can be automatically generated or they may involve some human decision-making (or a combination of both). In another arrangement, the managed device 115 may simply forward data to the management platform 105, and the platform 105 may monitor the parameters of the managed device 115 and direct the managed device 115 to undergo changes to restrict its operation, if such a modification is warranted. In either of these arrangements, the transfer of data/signals between the management platform 105 and the managed device 115 may be performed periodically (or even randomly) or based on a predetermined event or threshold.

Figure 2:
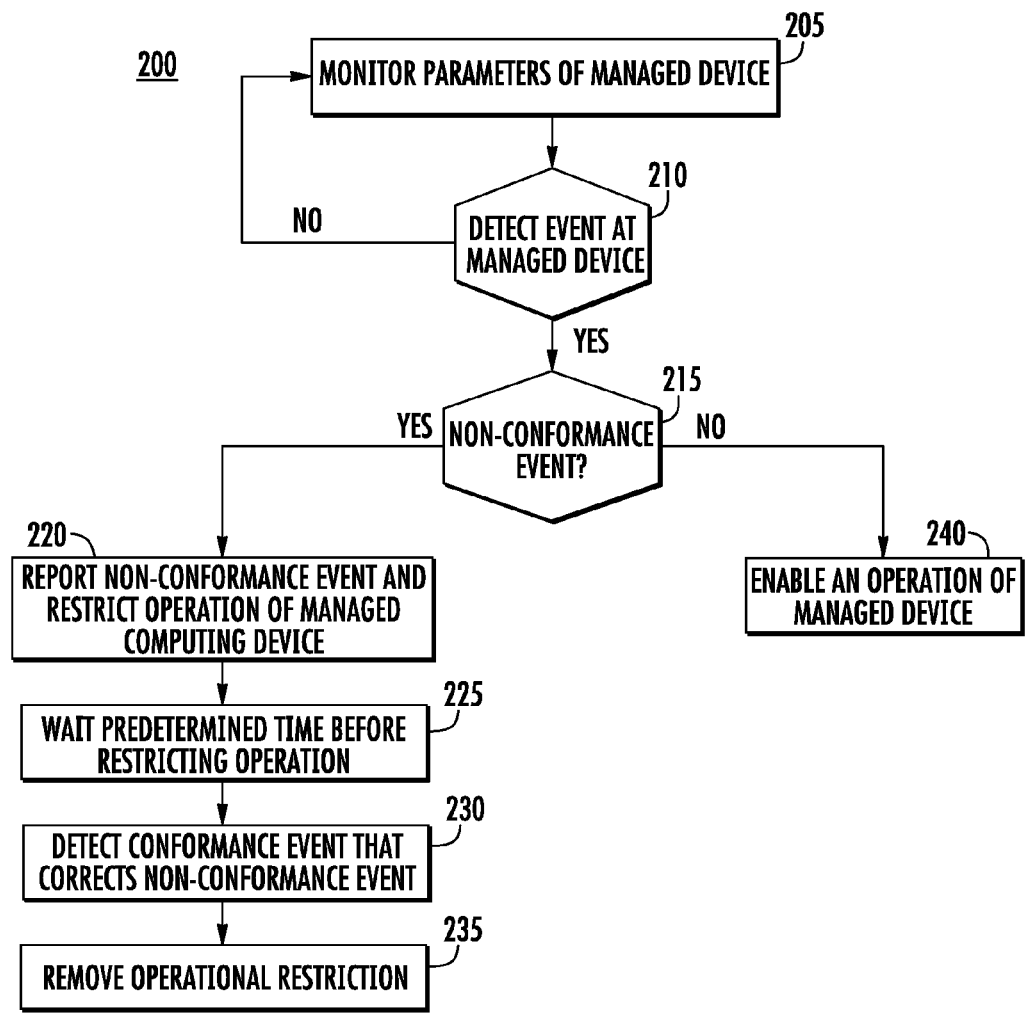
FIG. 2 illustrates an example of a method for ensuring compliance with organizational policies.

Referring to FIG. 2, a method 200 for ensuring compliance with organizational policies is shown. This method 200 is exemplary in nature, and the steps presented here are not limited to this particular chronological order. Moreover, the method 200 may be practiced with additional steps or with fewer steps in comparison to what is pictured here. References may be made to FIG. 1 to explain the method 200, but it is understood that the method 200 can be practiced with other suitable systems and components.

At step 205, one or more parameters of a managed computing device may be monitored for compliance with one or more policies of an organization, which may include limitations on the managed computing device. At decision block 210, it can be determined whether an event has been detected at the managed computing device with respect to at least one organizational policy. The event may be a conformance event or a non-conformance event. If no event has been detected, the method may continue at step 205. If an event has been detected, however, it can be determined whether the detected event is a non-conformance event, at decision block 215.

If the detected event is a non-conformance event, the method 200 may continue at step 220, where the non-conformance event may be reported and operation of the managed device may be restricted, such as with respect to features or data associated with the organization. As an option, a predetermined amount of time may be permitted to expire before restricting the operation of the managed device, as shown at step 225. Eventually, a conformance event that corrects the non-conformance event may be detected at the managed device, as shown at step 230. In response to detecting the conformance event, the operational restriction that has been applied to the managed device may be removed, as shown at step 235.

Returning to decision block 215, if the detected event is not a non-conforming event, it may be a conforming event. In response to the detection of the conformance event, an operation of the managed device may be enabled with respect to features or data associated with the organization, as shown at step 240. Examples associated with the method 200 will now be presented.

As previously noted, an organization may provide its associates with managed computing devices, or its associates may modify their managed devices to access organizational information. To protect itself, the organization may develop polices that place limitations on the managed devices and may determine that it is necessary to monitor the managed devices for compliance with these policies. Some non-limiting examples of such policies include one or more of the following: (1) password rules compliance to ensure associates use secure passwords; (2) blacklisted application compliance to prevent associates from downloading or installing unauthorized applications, programs or content on their managed devices; (3) installation of default applications or bundle compliance, which can ensure that associates have downloaded/installed required applications/programs or other content; (4) data roaming compliance for restricting associates from camping on or otherwise using unauthorized networks; (5) system modification compliance, which can minimize the affect that a jail-broken managed device may have; or (6) administrator control compliance to make certain that a management platform or some other administrative entity maintains its control over the managed device. It must be understood that there may be other operational policies that are within the scope of this description.

An organizational policy may be associated with an individual, a bundle (or group) or a node. For example, an organization may decide to apply policies on an individual basis such that each associate may have their own separate policies. As another example, the organization may develop policies for a particular group of associates, such as a unit related by job function. As a more specific example, the organization may wish to provide certain policies for its sales team, and a different set of policies for its executives. These groups of associates may be related by the bundles that they receive at their managed devices, as different bundles may be provided to different groups of associates. A bundle may contain, for example, default settings, applications, programs or other content that has been designated for a particular managed device. In view of this relation through received bundles, it can be said that an organizational policy may be associated with a particular bundle in that those associates who receive that bundle may also be subject to the same organizational policies.

A node may be a certain level in a setting that defines relationships between organizations. For example, a multi-national corporation may have a U.S. subsidiary and one or more foreign subsidiaries. As part of this example, the U.S. subsidiary may have one or more further subdivisions. Thus, the U.S. subsidiary may be on a higher level in the overall organizational setting than that of the U.S. subdivisions. These levels are akin to a node. As such, organizational policies may be established for a particular level in a hierarchical environment like the one described here. In this case, the U.S. subsidiary may have a set of organizational policies that are applicable to it, while the sub-divisions may have a different set of policies that are assigned to them. Thus, organizational policies may be tailored to any individual, group, node or any other organized setting.

To enforce organizational policies, the organization may wish to monitor one or more parameters of the managed devices. Non-limiting examples of such parameters include one or more of the following: (1) the selection of a password;

(2) the downloading or installation of applications, programs or other content, including those applications, programs or content that are required to be on a managed device; (3) the use of networks; (4) modifications made to the managed device, including hardware or software based changes; or (5) the access that an administrator or management platform may have with respect to the managed device. Any suitable combination of these parameters may be monitored, and of course, there are other parameters that are not listed here that may be monitored.

Figure 3:
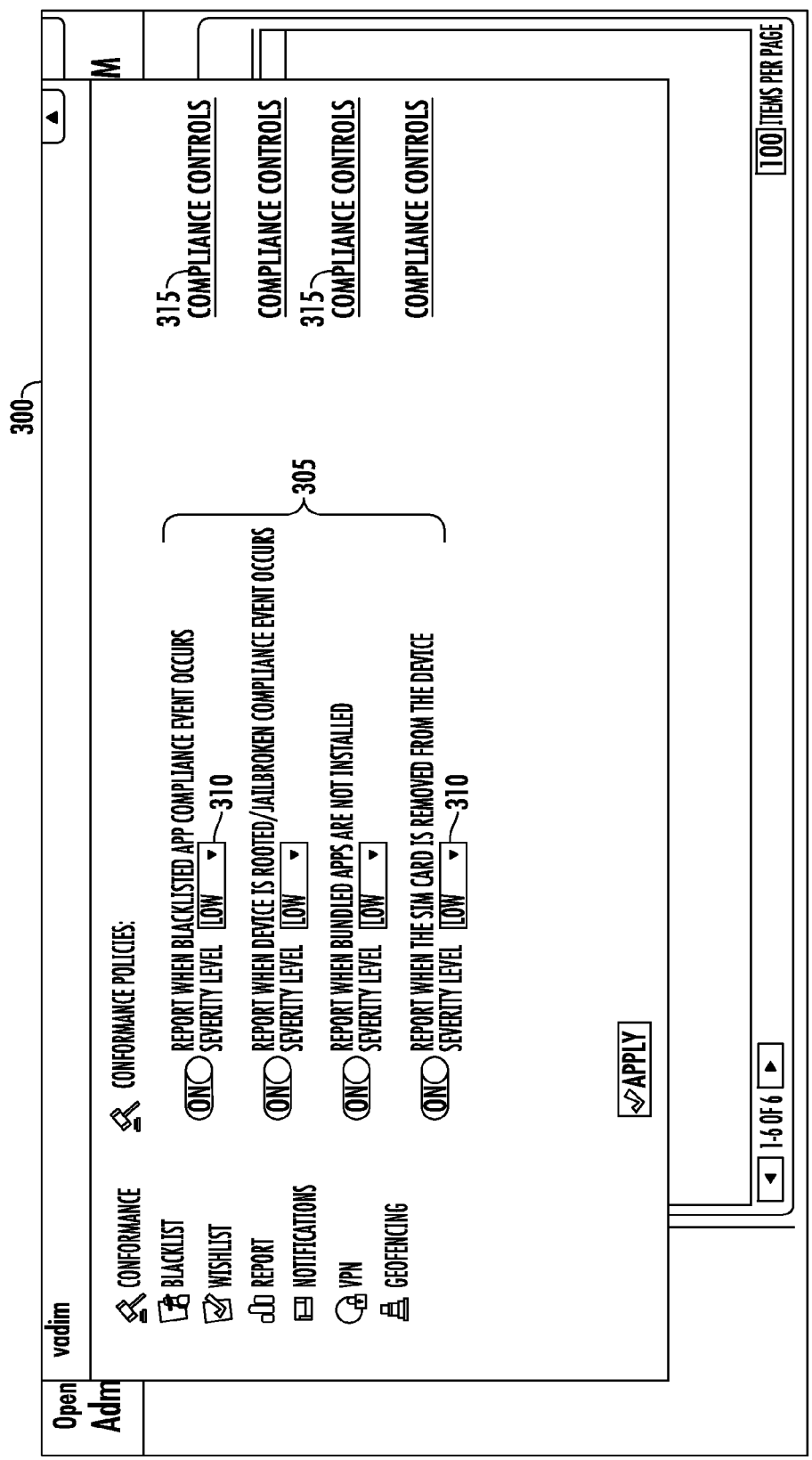
FIG. 3 illustrates an example of a user interface that presents several exemplary non-conformance events.

In view of these policies, a user of a managed device may violate or potentially violate one or more of them by taking certain unauthorized actions or by the omission of certain required procedures, which may result in a non-conformance event. The term "non-conformance event" is defined as an event occurring or about to occur at a managed computing device that at least substantially violates or conflicts with (or potentially substantially violates or conflicts with) an organizational policy. Referring to FIG. 3, an example of a user interface 300 that presents several exemplary non-conformance events 305 associated with a managed device. One of the non-conformance events 305 may be when a user of the managed device installs or downloads blacklisted (i.e., unauthorized) applications, programs or content, or at least attempts to do so. Another non-conformance event 305 may be when a user performs some unauthorized modification to the managed device, such as jail-breaking or rooting the device or removing the subscriber identity module (SIM) card from the device. Yet another non-conformance event 305 may be if a user has failed to install or download applications, programs or content that is required by the organization. As a more specific example, the user may have failed to download and install a set of default applications or default bundles that the organization requires the user to have on his/her managed device.

Figure 4:
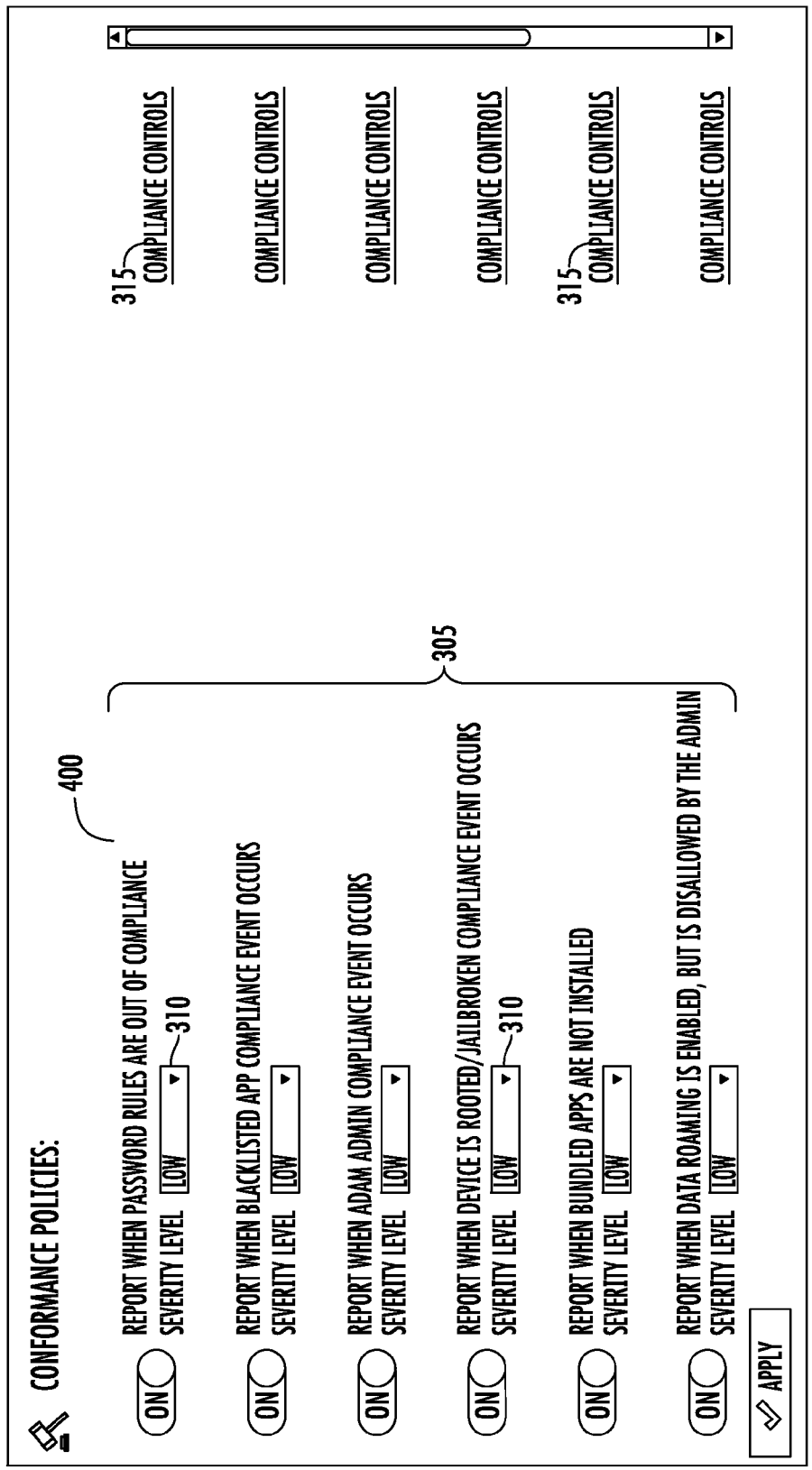
FIG. 4 illustrates another example of a user interface that presents several exemplary non-conformance events.

Referring to FIG. 4, another user interface 400 shows additional exemplary non-conformance events 305. For example, one of them may be when a user selects a password that does not comply with a set of rules that the organization has developed for its managed devices. Another example of a non-conformance event 305 may be when an administrator or a management platform does not have its full control (or at least a substantial percentage thereof) over the managed device, such as if the user disables or otherwise interferes with the client/agent 155 of the managed device 115. Another example of a non-conformance event 305 presented here is a condition in which the managed device 115 is roaming or otherwise operating on an unauthorized network. Of course, these examples are not meant to be exhaustive, as other non-conformance events may apply to this description.

As an option, one or more of the non-conformance events 305 may be designated with a severity level 310. The severity level 310 may provide a way to classify the non-conformance events 305 into one or more groupings. One example of a classification of severity levels 310 may include the designations of low, medium and high, and by assigning these levels to a non-conformance event 305, an administrator or other user of the management platform 105 may easily identify non-conformance events 305 by their severity. This classification system may also be used to automatically initiate a response to the non-conformance event 305. For example, a higher severity level 310 may warrant an automatic response in which certain predetermined actions are carried out to affect the operation of the managed device 115.

As noted above, in the event of a non-conformance event, the event may be reported, and the operation of the managed device may be restricted in some manner. As an example, the managed device 115 may detect and report the non-conformance event to the management platform 105 or some other component. As another example, the management platform 105 may detect and report the event to the managed device 115 or some other component. In either arrangement, there are numerous ways to carry out the process of restricting the operation of the managed device 115, and some of them will be described here. For example, data can be removed from the managed device 115, such as from the memory 140 or some other suitable component. As a particular example, some or all the organization's data may be wiped from the managed device 115, such as contacts, applications, profiles, operating information, etc. As another example, wireless communication settings or credentials may be removed from the managed device 115, which may render all or parts of the communications stack 150 inoperable. This step may shut down all the transceivers of the managed device 115 or just some of them. For example, the cellular and/or Wi-Fi transceivers may be disabled, but the Bluetooth transceiver may be left in an operable state. In another arrangement, only a portion of a transceiver may be disabled, such as the transmitter portion of a transceiver, meaning the managed device 115 could still receive information from the management platform 105.

Another example of restricting the operation of the managed device 115 is the removal of network settings or credentials from the device 115. This process may not necessarily affect the communications stack 150, but it may prevent the device 115 from accessing one or more networks (either wired or wireless networks). For example, if the managed device 115 has experienced a non-conformance event, then the device 115 may be prevented from accessing any non-secure network. As another example, VPN settings and/or credentials may also be removed from the managed device 115, which may prevent the device 115 from accessing a secure connection and any components serviced by that connection.

Another way to restrict the operation of the managed device 115 is by removing a proxy configuration from the managed device 115. While this step may not necessarily affect the communication stack 150 or the ability of the device 115 to access various networks, it may prevent the device 115 from accessing the management platform 105 or other protected environments. This process may also remove from the managed device 115 the protections afforded by a proxy arrangement. Similarly, an email or other messaging configuration may be removed from the managed device 115 in response to the detection of a non-conformance event. This response may prevent the managed device from sending and/or receiving email or other messages. In another arrangement, the operation of the managed device 115 may be restricted by disabling (completely or partially) device configuration updates, which may block the managed device 115 from receiving, for example, software updates.

In some cases, multiple profiles may be established on a managed device 115, such as a personal profile and a work profile. The personal profile may include settings, applications, programs and other content that belongs to an associate of the organization or is otherwise associated with the personal lifestyle of the associate. The work profile, in contrast, may include settings, applications, programs and other content that is associated with or otherwise owned by the organization, and the material that makes up the work profile may be protected in some way, such as password protected. In this case, if a non-conformance event is detected, the work profile may be locked, which would fully restrict access to the work profile or block portions of it. In the case of partial restriction of the work profile, the user of the managed device 115 may not be able to access, for example, certain applications that are part of the work profile.

In another arrangement, restricting the operation of the managed device 115 may be performed by simply messaging a user of the managed device 115. For example, the management platform 105 may generate one or more messages to be delivered to the managed device 115 or even some other component associated with the user, like a mobile device or a desktop computer. The managed device 115 may itself generate a message, which can be displayed or broadcast to the user of the device 115. The message may inform the user of the non-conformance event and a description of the event. The message may also explain what may happen if the user does not take steps to correct the event, such as possible operational restrictions being placed on the device 115. Any number of messages may be sent, and any suitable type of information may be contained in these messages.

Any number of these examples of operational restrictions may apply to any type of non-conformance event. For example, if a user of the managed device 115 has chosen a password that violates the organization's policy on password selection, the work profile of the managed device 115 may be locked out or removed from the device 115. As an option, a message can be delivered to the user prior to taking such action to ensure that the user is aware of the consequences of not complying with the password policy.

In another arrangement, the type of operational restrictions that are executed may depend on the severity level that is assigned to the non-conformance event. For example, if a severity level of "high" is assigned to the non-conformance event in which a user selects a non-compliant password, then a stronger response may be expected for the operational restrictions, such as locking out a work profile. On the other hand, if the severity level is not as severe (e.g., "low"), then a more moderate response may apply, such as simply messaging the user of the device 115. As such, any suitable number and type of operational restrictions may be tied to any suitable number and type of non-conformance events. This tie-in may be or may not be dependent upon any severity level that is assigned to a non-conformance event. That is, as an option, it may be decided to assign certain operational restrictions to certain non-conformance events based on a severity level of the event, although the description is not limited to this particular arrangement. In fact, operational restrictions may be assigned to non-conformance events irrespective of a severity level. These assignments may be made prior to a non-conformance event, or they may be decided when such an event occurs or even following the occurrence of the event.

Before an operational restriction is imposed on a managed device 115, it may be desirable to wait a predetermined time. For example, in response to a non-conformance event, a user may be provided with a message informing the user of the event, how to take corrective steps and the consequences if no action is taken. The user may be provided with a certain amount of time to correct the non-conformance event, and the operational restriction may be executed following the expiration of this time. This time may be indicated in the message, and its amount may be variable. For example, more severe non-conformance events may warrant less time for a user response than less severe events.

It is understood that the description herein is not limited to these particular examples of operational restrictions. That is, other operational restrictions may apply here, and they may be assigned to the non-conformance events, as illustrated above, based on certain factors, like a severity level.

The user of the managed device 115, in response to the operational restriction imposed on the device 115, may decide to restore the device 115 to its previous or uninhibited condition. To do so, the user may take action to overcome the restriction, such as correcting the non-conformance event. For example, the user may select a password that complies with the organization's policy on passwords or the user may delete an unauthorized application from the managed device 115. In response, the operational restrictions that were imposed on the device 115 may be removed, although it is possible to keep one or more (if not all) of these restrictions in place, if so desired.

As a reminder, a non-conformance event is not the only event that may be registered at the managed device 115. For example, a conformance event may be detected at the device 115, and in response, an operation of the device 115 may be enabled. The term "conformance event" is defined as an event occurring or about to occur at a managed computing device that at least substantially complies with (or potentially substantially complies with) an organizational policy. As a specific example, a user may select an authorized password or may download/install one or more authorized default applications or bundles, and the organization may permit its data to be accessed from or downloaded to the managed device 115. Other non-limiting examples of conformance events may include one or more of the following: (1) the downloading or installation of an authorized application; (2) operating the managed device 115 on an authorized network; (3) avoiding the unauthorized modification of the managed device 115 (such as rooting or jail-breaking the device 115); or (4) permitting administrator control of the managed device 115. Other examples not listed here may be applicable.

In the event of a conformance event, one or more enablement actions may be carried out. For example, a profile, such as a work profile and/or a personal profile, may be created or the configuration of updates for the managed device 115 may be activated, which may allow for software updates or modifications to settings on the device to be updated or otherwise modified. Of course, other examples not listed here may apply and any of them may be relevant to any type and number of conformance events.

Figure 5:
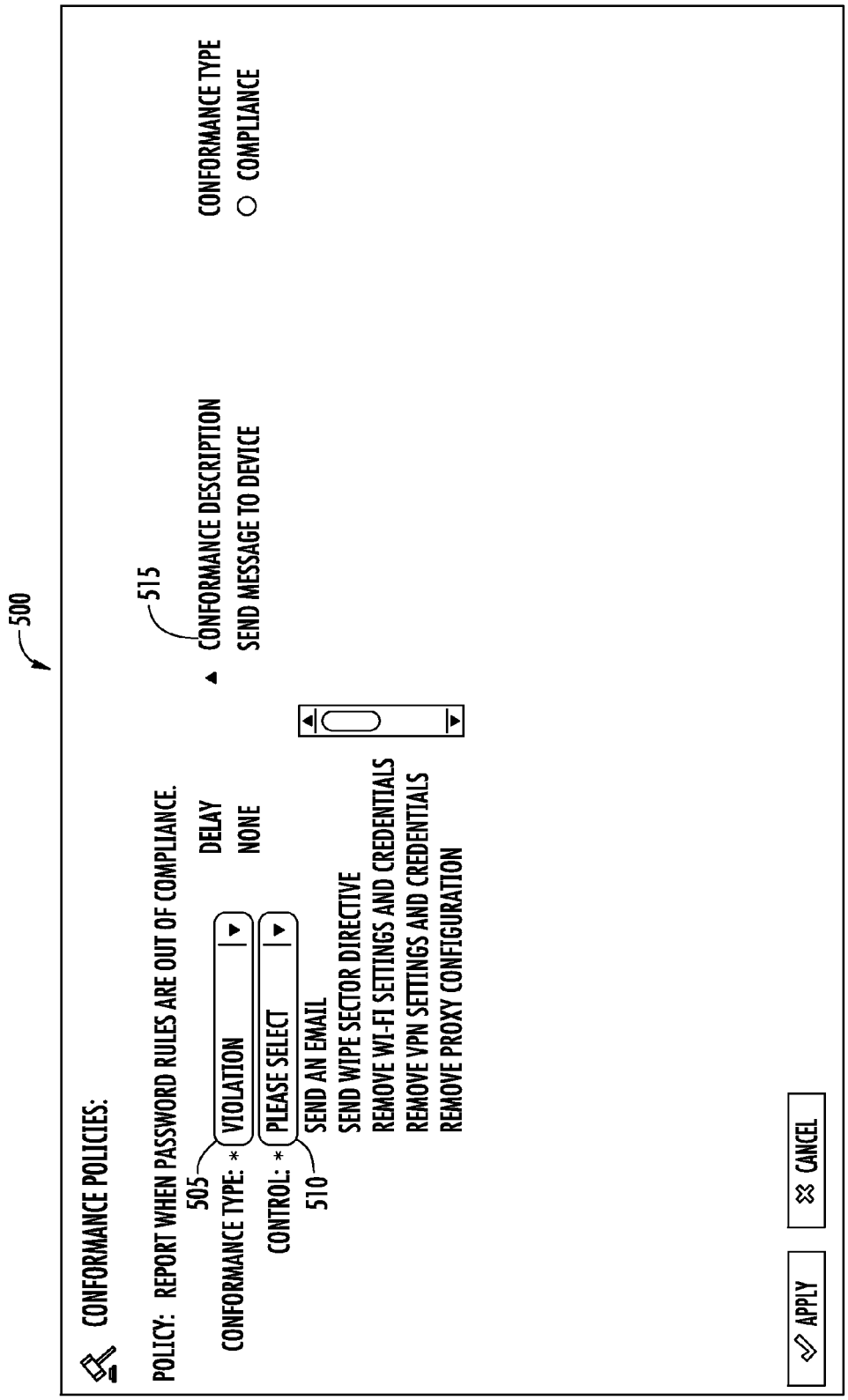
FIG. 5 illustrates an example of a user interface that shows several elements for compliance control.

There are numerous ways to implement the processes described above. Nevertheless, it may be helpful to present several exemplary user interfaces that show some such ways. Referring again to FIGS. 3 and 4, several compliance control links 315 are shown. In one arrangement, there may be one compliance control link 315 for each non-conformance event 305 (or each conformance event), although the description here is not so limited. By clicking these links 315, a user may set or adjust the operational restrictions that may be imposed on the managed device 115 in the face of a non-conformance event. These links may also enable a user to set or adjust any enabling operations or actions that may be carried out in view of a conformance event. Referring to FIG. 5, an example of a user interface 500 that illustrates several elements for compliance control is shown, and the user interface 500 may be reached via a compliance control link 315.

In this exemplary user interface 500, it can be shown to which non-conformance event 305 or which organizational policy the interface 500 corresponds. For example, in this case, the non-conformance event 305 is when a user of the managed device 115 selects a non-compliant password. To set a response for such an occurrence, the user interface 500 may include a conformance type section 505 and a control section 510. As an example, the conformance type section 505 may permit selection of at least two conformance types: (1) violation; and (2) compliance. It is understood, however, that there may be additional selections that apply to this description.

When a conformance type is selected, the control section 510 may provide one or more selections for implementing a particular operational restriction. Some of the examples shown here may be similar to, build on or supplement the operational restrictions previously described. For example, some of the operational restrictions that are available for this non-conformance event include one or more of the following: (1) sending an email to the managed device, which may inform the user of the event and the possible consequences; (2) sending a wipe directive, which may involve removing organizational data or a work profile from the managed device 115; (3) removing Wi-Fi settings and credentials, which can disable the ability of the managed device to communicate over a Wi-Fi network; (4) removing VPN settings and credentials, which may prevent them managed device 115 from accessing a secure connection to a remove server; or (5) removing a proxy configuration, which may partially or at completely block the managed device 115 from accessing certain websites or other services.

Figure 6:
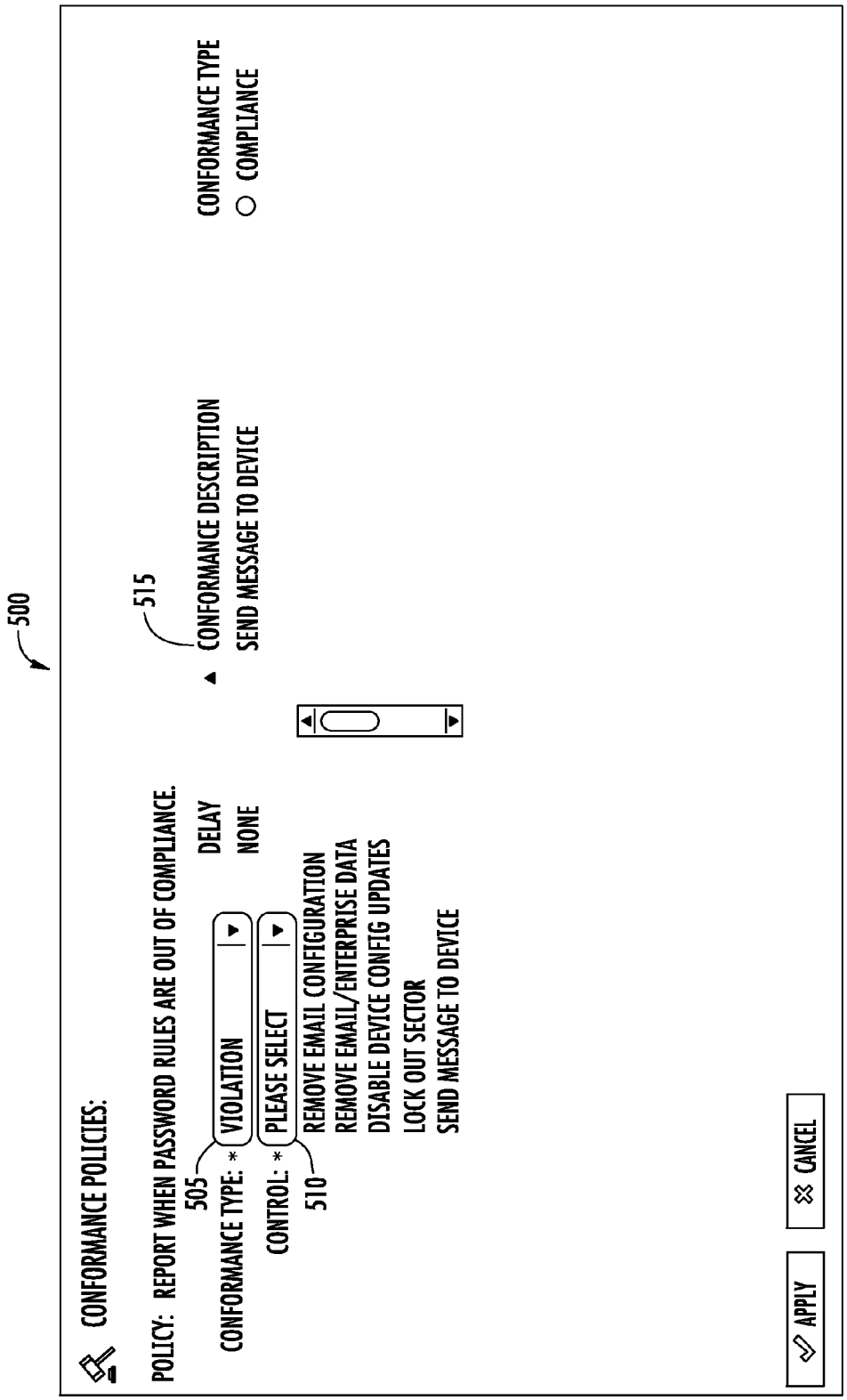
FIG. 6 illustrates the user interface of FIG. 5 with additional elements for compliance control.

There are several other examples of operational restrictions that may be selected from the control section 510, which are shown in FIG. 6. In particular, an email configuration may be removed from the managed device 115—which may prevent the device 115 from sending, receiving or both sending and receiving emails—or email or enterprise (e.g., organization) data may be removed from the device 115. As another example, configuration updates for the device 115 may be disabled, or a profile may be locked out. Messages may also be sent to the managed device 115 or to some other relevant component. It is understood, however, that these examples are not limiting, as other operational restrictions may be applicable.

The control section 510 may enable the user to select one or more enablement actions to be carried out when a conformance event is detected. For example, referring to FIG. 7, there are several exemplary alternatives that may be selected as enablement actions, which are listed as follows: (1) sending a message (e.g., email) to the managed device 115 or some other component; (2) enabling a profile (such as a work profile); or (3) enabling configuration updates for the device.

Figure 7:
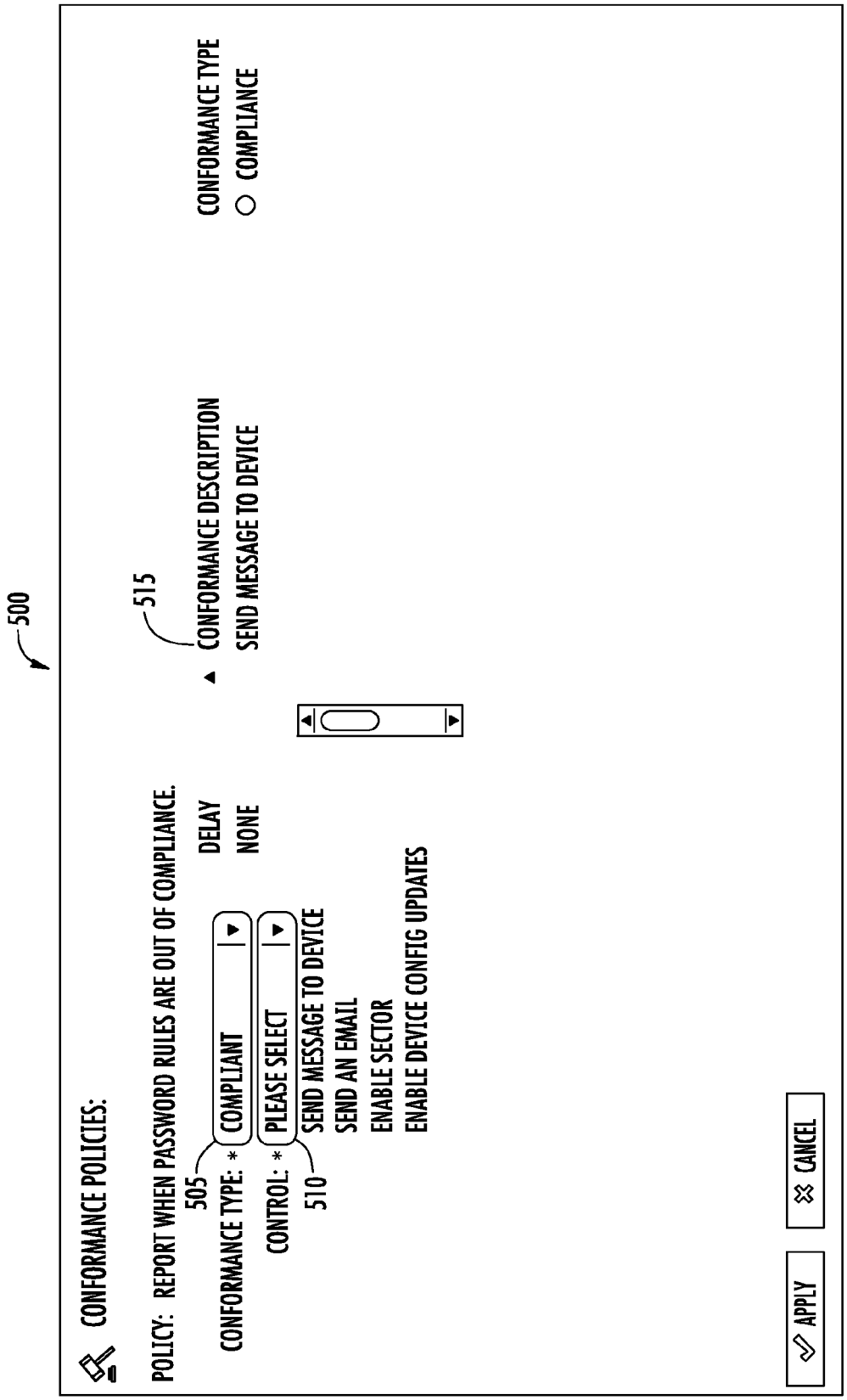
FIG. 7 illustrates the user interface of FIG. 5 showing several enablement actions.

Referring to FIGS. 5, 6 and 7, the user interface 500 may include a listing 515, which may show which operational restrictions or enablement actions are set for a particular non-conformance or conformance event. For example, an enablement action is currently shown in the listing 515 for a conformance event where a user selects an authorized password. In this case, the enablement action is the sending of a message to the managed device 115 when the password is selected, with no delay in its delivery. As can be seen here, the conformance type is shown as a compliance type. If additional enablement actions or operational restrictions are selected, they may be listed here, too.

Figure 8:
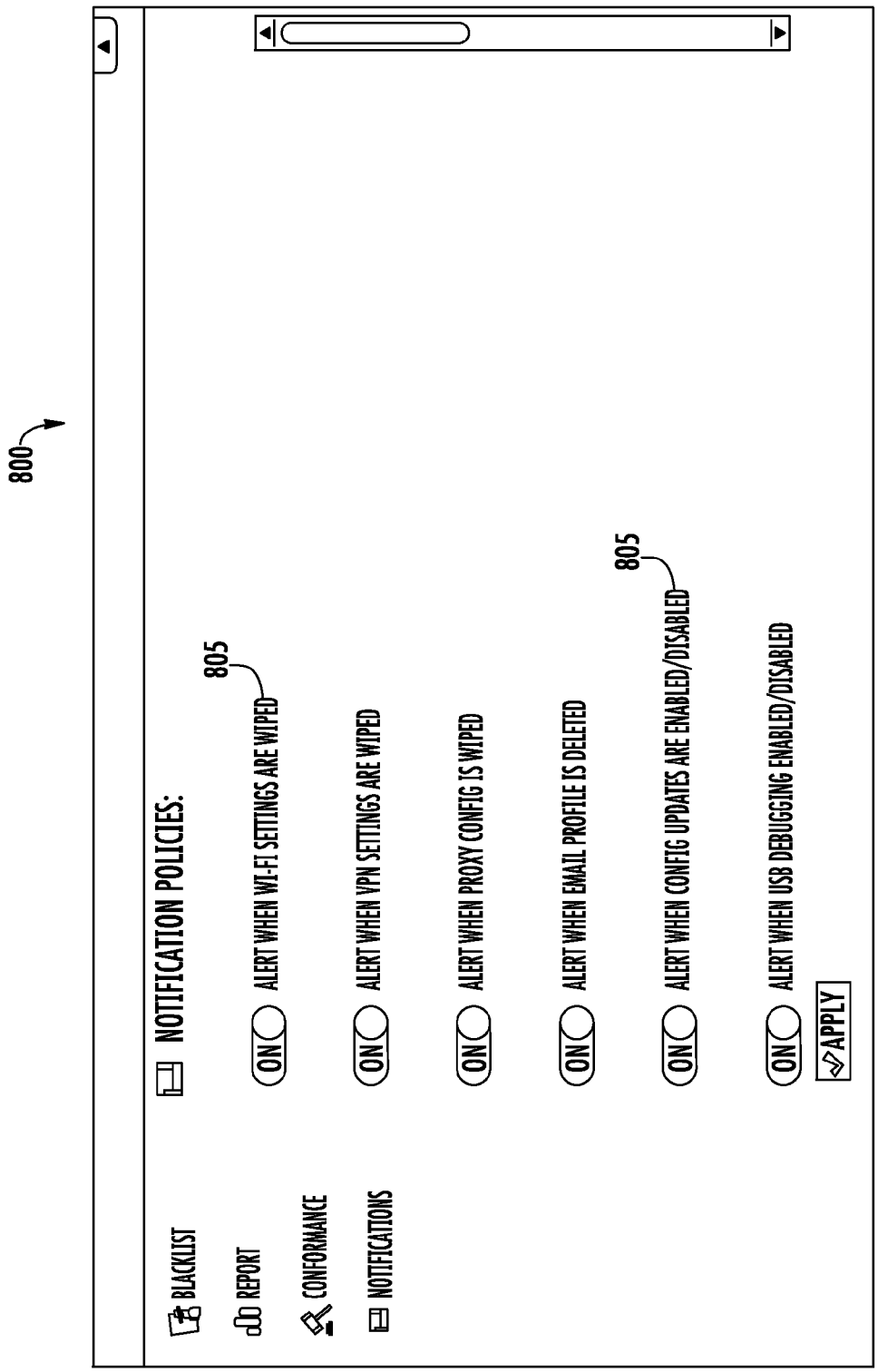
FIG. 8 illustrates an example of a notification policy interface.
Figure 9:
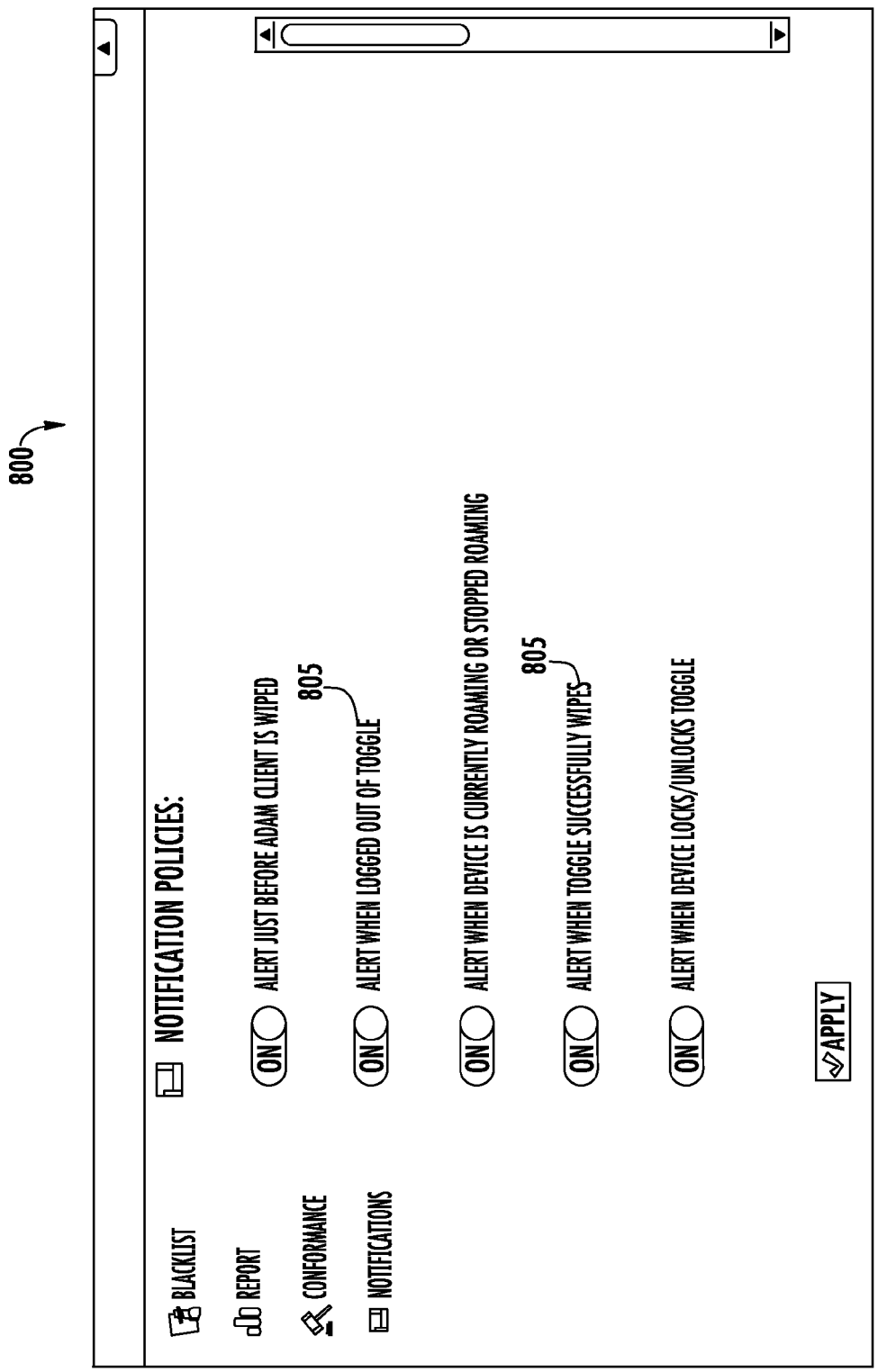
FIG. 9 illustrates an example of another portion of the notification policy interface of FIG. 8.

As previously mentioned, non-conformance events, conformance events or other information relating to these events may be reported to any suitable component(s), like the managed device 115 itself or the management platform 105. As part of this reporting feature, certain selections may be made and information may be aggregated for an administrator or some other party. Referring to FIGS. 8 and 9, an example of a notification policy interface 800 is shown, which illustrates multiple exemplary alerts 805 that may be selected for reporting. As can be seen, these alerts 805 may be activated, which would cause them to be reported in accordance with any predetermined protocol. These alerts 805 may also be deactivated.

The examples of alerts 805 are listed as follows, and they may supplement or add to previous discussions: (1) alert when Wi-Fi settings are wiped (i.e., removed); (2) alert when VPN settings are wiped; (3) alert when a proxy configuration is wiped; (4) alert when an email profile is deleted; (5) alert when configuration updates are enabled or disabled; (6) alert when USB debugging is enabled or disabled; (7) alert prior to a client/agent being wiped; (8) alert when logged out of a profile or other protected content, applications or programs; (9) alert when the managed device 115 is currently roaming or has roamed or has stopped doing so; (10) alert when a profile or other protected content, applications or programs have been wiped; or (11) alert when the managed device 115 has locked or unlocked a profile or other protected content, applications or programs. Of course, these examples are not meant to be limiting, as alerts may be generated for other events that occur at the managed device 115.

Figure 10:
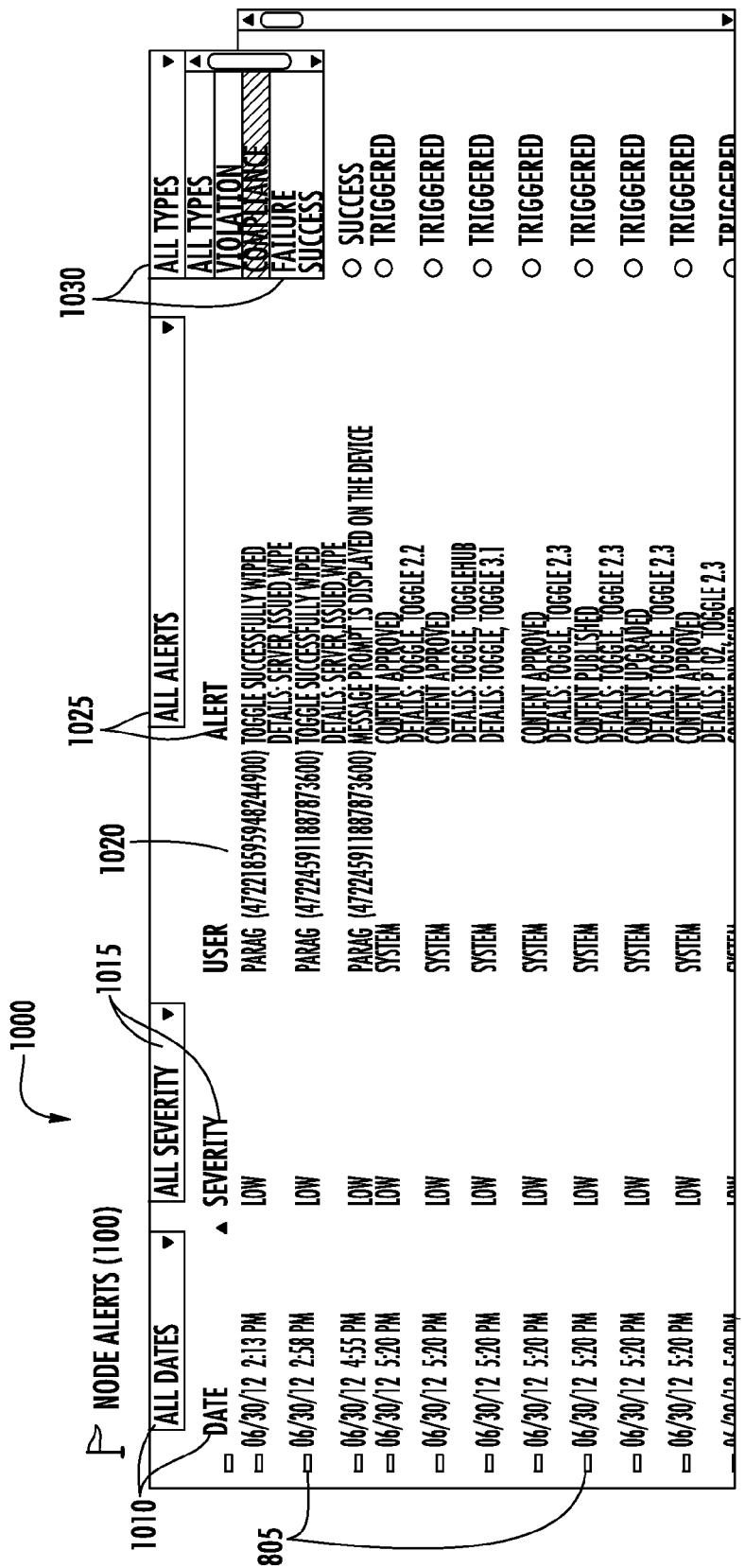
FIG. 10 illustrates an example of a notification listing.
Figure 11:
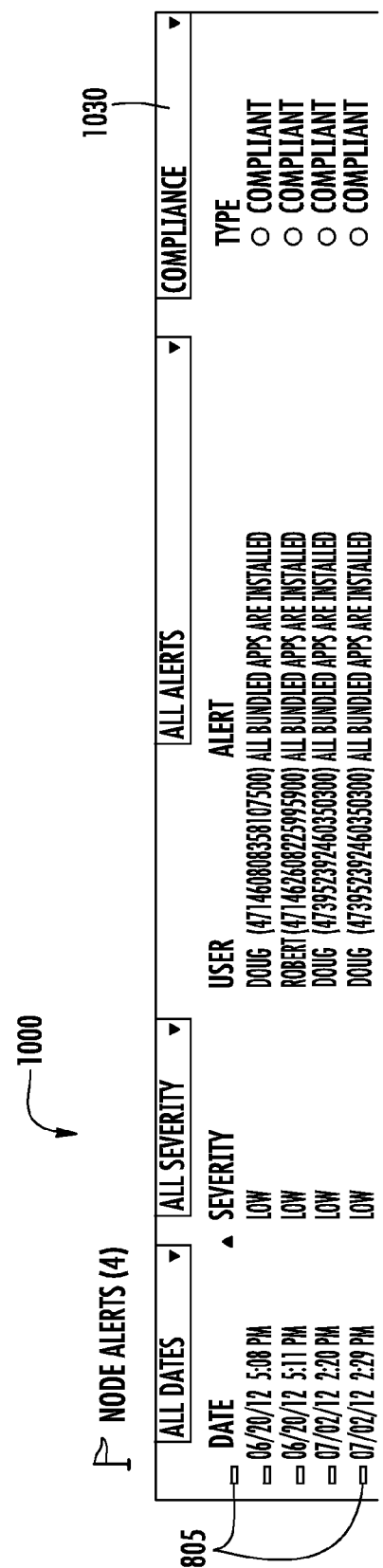
FIG. 11 illustrates an example of the notification listing of FIG. 10 with an exemplary grouping.

The alerts 805 may be collected, and they can even be grouped together according to one or more criteria. Referring to FIG. 10, an example of a notification listing 1000 is shown in which a number of received alerts 805 are listed. As can be seen, each alert 805 can include a time/date 1010 of its receipt, a severity level 1015, the user 1020 to which the alert 805 is attached, a short description 1025 of the alert 805 and the conformance type 1030. In one arrangement, the alerts 805 may be grouped according to each of the time date 1010, the severity level 1015, the user 1020, the description 1025 and the conformance type 1030. For example, in FIG. 10, the conformance type 1030 may be selected to show only those alerts that are related to conformance or compliant events, an example of which is illustrated in FIG. 11. It is important to note that the alert examples presented here are not meant to be limiting, as there are other alerts that may apply to the description here. Moreover, the alerts may be grouped according to any combination of the factors listed here or even others that are not listed here.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the claims and their equivalents should not be limited by any of the above-described exemplary embodiments.

What is claimed is:

1. A method for ensuring compliance with organizational policies, comprising the following computer-implemented steps:

monitoring one or more parameters of a managed computing device for compliance with one or more policies of an organization, wherein the organizational policies include limitations on the managed computing device, wherein the managed computing device has a work profile that includes applications associated with or owned by the organization and a personal profile that includes applications or settings associated with a personal lifestyle of or owned by a user of the managed computing device;

detecting a non-conformance event at the managed computing device with respect to at least one organizational policy; and in response to the detection of the non-conformance event, restricting operation of the work profile of the managed computing device by locking the entire work profile or at least some of the applications associated with or owned by the organization without impacting the applications or settings of the personal profile.

2. The method according to claim 1, wherein restricting the operation of the work profile further comprises restricting operation of the work profile of the managed computing device by locking or wiping the entire work profile or at least some of the applications associated with or owned by the organization without impacting the applications or settings of the personal profile.

3. The method according to claim 1, wherein restricting the operation of the work profile further comprises restricting operation of the work profile of the managed computing device by removing wireless communication settings or credentials from the managed computing device; removing network settings or credentials from the managed computing device; removing a proxy configuration from the managed computing device; removing an email or messaging configuration from the managed computing device; disabling device configuration updates from the managed computing device; or messaging a user of the managed computing device.

4. The method according to claim 3, wherein messaging the user of the managed computing device comprises messaging the user of the managed computing device by informing the user of the non-conformance event, how to take corrective action and the consequences if no action is taken.

5. The method according to claim 1, wherein the organizational policies include one or more of the following: password rules compliance; blacklisted application compliance; installation of default applications or bundle compliance; data roaming compliance; system modification compliance; or administrator control compliance.

6. The method according to claim 1, wherein the non-conformance event comprises one or more of the following: selecting an unauthorized password; downloading an unauthorized application; failing to install one or more default applications or bundles; roaming on an unauthorized network; modifying the managed computing device in an unauthorized manner; or blocking administrator control of the managed computing device.

7. The method according to claim 1, wherein the organizational policy is associated with an individual, a bundle that contains default applications designated for the managed computing device, or a node.

8. The method according to claim 7, wherein the node is a level in a hierarchical environment that defines relationships between the organization and another organization and the organizational policies are established for that node.

9. A method for ensuring compliance with first organizational policies, comprising the following computer-implemented steps:

setting one or more policies of a first organization, wherein the first organizational policies are applicable to a managed computing device associated with the first organization and include limitations on the managed computing device, wherein the managed computing device has a work profile that includes settings and applications associated with or owned by the first organization and a personal profile that includes settings and applications associated with a personal lifestyle of or owned by a user of the managed computing device;

receiving a report of a non-conformance event at the managed computing device, wherein the non-conformance event indicates that the managed computing device is violating one or more first organizational policies; and in response to the receipt of the reporting of the non-conformance event, restricting operation of the work profile of the managed computing device by locking or wiping the settings or applications associated with or owned by the first organization without impacting the settings or applications of the personal profile.

10. The method according to claim 9, wherein the first organization is part of a hierarchical environment that defines a relationship between the first organization and a second organization and the first organizational polices are applicable to the first organization while a different set of organizational polices are applicable to the second organization.

11. The method according to claim 10, wherein the first organization is an organization based in the United States and the second organization is based in a country that is foreign to the United States.

12. The method according to claim 9, wherein the non-conformance event that causes the restriction of the operation of the work profile of the managed computing device is a predetermined non-conformance events such that the restriction to the operation of the work profile is assigned prior to the occurrence of the non-conformance event.

13. The method according to claim 9, further comprising waiting a predetermined time prior to restricting operation of the work profile.

14. The method according to claim 13, further comprising assigning severity levels to non-conformance events, wherein the predetermined time is shorter for a first non-conformance event in comparison to a second non-conformance event and the first non-conformance event is assigned a higher severity level in comparison to the second non-conformance event.

15. A managed computing device, comprising:
a display configured to at least display messages;
a communications stack configured to receive communication signals from and transmit communication signals to a management platform; and
a processor, wherein the processor is communicatively coupled to the communications stack and the display and is operable to:
monitor one or more parameters of the managed computing device for compliance with one or more policies of an organization, wherein the organizational policies include limitations on the managed computing device, wherein the managed computing device has a work profile that includes applications associated with or owned by the organization and a personal profile that includes applications and settings associated with a personal lifestyle of or owned by a user of the managed computing device;
detect a non-conformance event associated with the operation of the managed computing device, wherein the non-conformance event violates one or more organizational policies; and in response to the detection of the non-conformance event, restrict operation of the work profile of the managed computing device by locking the entire work profile or at least some of the applications associated with or owned by the organization without impacting the settings or applications of the personal profile.

16. The managed computing device according to claim 15, wherein the processor is further configured to restrict the operation of the work profile by locking or wiping the entire work profile or at least some of the applications associated with or owned by the organization without impacting the settings or applications of the personal profile.

17. The managed computing device according to claim 15, wherein the processor is further configured to restrict the operation of the work profile of the managed computing device by removing network settings or credentials to prevent the managed computing device from accessing a secure connection.

18. The managed computing device according to claim 17, wherein the removal of the network settings or credentials to prevent access to the secure connection does not affect the operation of the communications stack.

19. The managed computing device according to claim 15, wherein the processor is further configured to restrict the operation of the work profile of the managed computing device by removing a proxy configuration from the managed computing device such that the managed computing device is prevented from accessing a protected environment, wherein the operation of the communications stack is not affected by the removal of the proxy configuration.

20. The managed computing device according to claim 15, wherein the non-conformance event comprises one or more of the following: selecting an unauthorized password; downloading an unauthorized application; failing to install one or more default applications or bundles; roaming on an unauthorized network; modifying the managed computing device in an unauthorized manner; or blocking administrator control of the managed computing device.

* * * * *